April 18, 1933. W. TRAVIS 1,904,907
METHOD AND APPARATUS FOR THE EXTRUSION OF METAL
Filed Nov. 4, 1931 2 Sheets-Sheet 1

INVENTOR
William Travis
BY
Byrnes, Stebbins, Parmelee & Blenko
his ATTORNEYS

Patented Apr. 18, 1933

1,904,907

UNITED STATES PATENT OFFICE

WILLIAM TRAVIS, OF BLACKLEY, MANCHESTER, ENGLAND

METHOD AND APPARATUS FOR THE EXTRUSION OF METAL

Application filed November 4, 1931, Serial No. 573,937, and in Great Britain November 5, 1930.

This invention relates to extrusion processes which take place under conditions which involve a definite fall of temperature so that the material, which is supplied to the apparatus in the molten state, is extruded in the plastic state. The invention accordingly applies to a large number of materials, both metallic and otherwise.

The apparatus used includes an extrusion chamber from which the plastic material is driven forward through a die or dies which impart to it the appropriate shape and dimensions as it leaves the chamber. In addition it also includes two other parts structurally distinct from the extrusion chamber, namely, means such as a pump device for giving impulsive movement to the molten material and a connecting passage or passages between this device and the extrusion chamber. Generally the device will consist of several units each with its connecting passage leading to the extrusion chamber. The passage or each passage, where there are several, is materially smaller in cross-section than the chamber so that a definite temperature control of the condition of the material throughout the cross-section of the passage or each passage may be exerted. This difference in cross-section constitutes the structural distinction between the passage or passages and the extrusion chamber.

In accordance with the invention the molten material is fed forward towards the extrusion chamber in a series of impulses and the material is subjected to cooling before it enters the extrusion chamber so that the material in that chamber is in a plastic state; these impulses, being transmitted to the plastic material in the chamber, force it forward through the die or dies. As a result of the cooling action on the incoming material there is a greater uniformity in the condition of the material in the extrusion chamber and in particular it is made impossible for a thread of molten material to pierce through the main body of plastic material and reach a die.

The apparatus comprises a device such as a pump for producing impulsive flow of the molten material, that is to say, a flow which consists of short periods of movement alternating with periods of rest. This works in conjunction with a cooling passage through which the material passes prior to entering the extrusion chamber, this being arranged to remove sufficient heat to convert the material from the molten to the plastic state. We prefer to use a number of pumps feeding a single extrusion chamber, the arrangement being such that the flow impulses are delivered in succession at different points round the circumference of the extrusion chamber.

The pumps may be arranged in a convenient position for operation and connected to the points of delivery by pipes which are controlled in temperature so as to maintain the material in the molten state whilst passing through them. This may be carried out by passing electric currents through the pipes, for instance, low voltage currents flowing along the pipes and heating them and their contents by the resistance method. The cooling passage will then be arranged directly on the extrusion chamber so as to serve as the connection between the pipes and that chamber. These entrances are preferably arranged substantially equidistantly apart and the driving gear for the pumps made such that the impulses applied by them to the material in the chamber follow each other at approximately diametrically opposite points of the chamber; for instance, if there are six points of delivery equally spaced round the chamber and numbered in order from one to six, the sequences of the impulses may be arranged in the following order, 1, 4, 2, 5, 3, 6.

The invention will be described further with the aid of the accompanying diagrammatic drawings which indicate how the apparatus can be constructed and arranged for the extrusion of lead to form a pipe or a sheath of an electric cable.

In these drawings, Figure 1 is an end elevation, with parts in section, of the apparatus;

Figure 1:
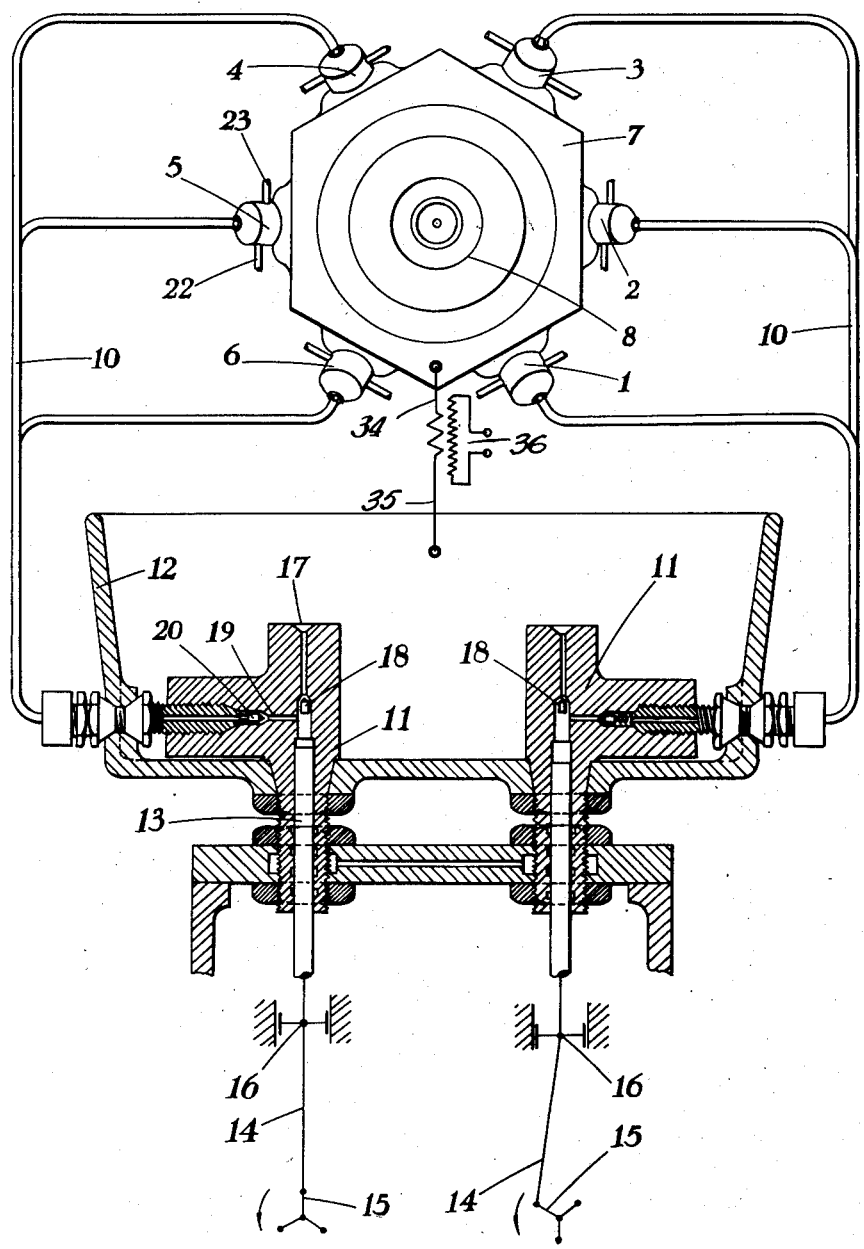
Figure 2:
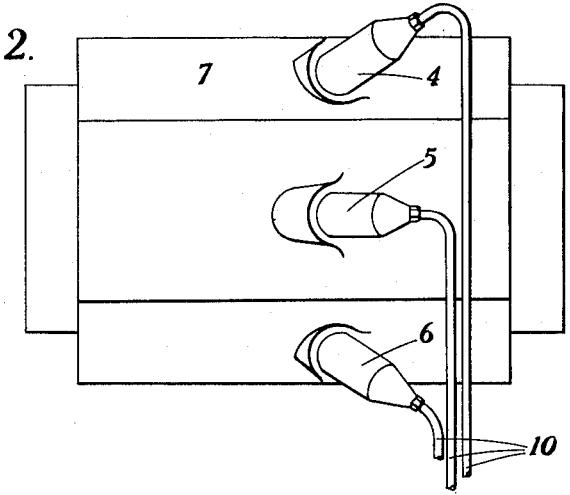
Figure 2 is a side elevation of the die box.

The die box 7 has a central aperture 8 through which passes the cable, when the apparatus is used for applying a sheath to a cable. The annular space 9 within the die box is full of plastic lead and may be provided with means for maintaining it at an appropriate temperature to ensure that the pressure required for extrusion does not become excessive. Round the die box, spaced equidistantly are six cooling passages 1, 2, 3, 4, 5 and 6 through which the die box is fed. These passages are connected by means of pipes 10 with six pumps 11 which are located in a pot 12, which is kept at such a temperature, by means not shown, that the lead in it is in the molten state. Each pump consists of a ram 13 actuated by means of a connecting rod and crank indicated diagrammatically at 14 and 15. The connecting rod has a cross-head 16 working in appropriate guides. In the upper end of each pump 11 is an inlet passage 17, controlled by a valve 18 which opens during the downward stroke of the ram, so as to admit lead to the cylinder. The side passage 19 leads to the delivery valve 20 which is closed during the downward stroke of the ram, but opens when the upward stroke commences. The inlet valve 18 closes at this point so that the upward stroke forces the molten metal to flow along the pipe 10 into the appropriate cooling passage and from there into the die box.

The rotation of the cranks 15 causes this impulsive supply of molten metal to be sent out by each pump in succession.

In the arrangement shown there are two crank shafts which are arranged side by side and connected together so as to rotate synchronously. The arrangement of the cranks is such that the impulses reach the cooling passages in the order 1, 4, 2, 5, 3, 6 previously mentioned. In the position shown in Figure 1 the right-hand pump has completed its delivery to cooling chamber 1 and is drawing in lead past its valve 18. The pump at the left-hand side has just completed its delivery to chamber 4.

It will be understood that there are two other pumps on the left-hand side connected to passages 5 and 6 and two others on the right-hand side connected to chambers 3 and 2. These pumps cannot be shown in the drawings, but their presence is indicated by the three-throw crank shaft at each side.

Each of the cooling passages is made as a short cylinder tapering to a neck at the rear or inlet end, and a cooling arrangement is provided by ducts 21 formed in the wall of the cylinder through which liquid (for instance oil) can be passed, entering by the pipe 22 and leaving by the pipe 23. As this wall has considerable thickness to withstand the pressure under which it works, it is preferable to arrange the cooling duct near the inner surface of this wall. This can be done by boring out the cylinder 24 to a greater diameter than that of its working space and inserting a liner 25 to make up the difference, this liner having a helical groove cut in its outer face. This groove in combination with the inner surface of the cylinder 24 makes a closed helical passage for which inlet and outlet ports are provided in the wall of the cylinder.

Where heating of the pipes 10 is necessary it can be carried out as indicated diagrammatically in Figure 1. The supply of electric energy for heating is made by way of the transformer 36, the low voltage side of which is connected by conductors 34 and 35 to the die box 7 and the pot 12. It will be understood that the conductors 34 and 35 are of heavy section and that the principal resistance in the return circuit is provided by the pipes 10, so that heating will be effected in these pipes. In order to produce approximate uniformity of heating in the several pipes it will, of course, be necessary to ensure that their resistances are approximately equal. Owing to the diagrammatic nature of Figure 1 it does not show this equalization.

Figure 3:
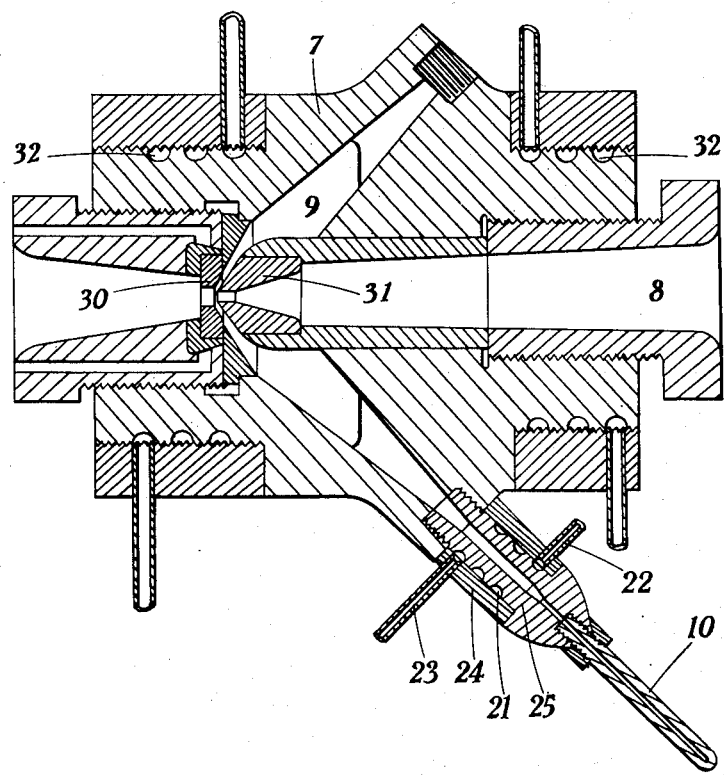
Figure 3 is a longitudinal central section of the die box.

As shown in Figure 3 the die box 7 contains outer and inner dies 30 and 31 located in the centre of the annular space 9 which is generally of conical form, the side walls gradually converging as the dies are approached. The cooling passages are connected with the rear of this chamber. The body of the die box may be provided with cooling passages 32 near its ends to prevent the transmission of excessive heat to the cable passing through the die box.

It will be seen that the impulses of plastic metal applied to the rear of the annular conical chamber will force forward the plastic metal therein and cause it to issue in the form of a tube between the dies 31 and 30.

The dies will, in general, be mounted in a manner convenient for removal so that they may be replaced by others of suitable size as the dimensions of the product required from the apparatus vary.

What I claim as my invention and desire to secure by Letters Patent is:—

1. A method of extrusion comprising feeding molten material towards an extrusion chamber by a series of impulses and in a stream of much smaller cross-section than the cross-section of the extrusion chamber, subjecting this stream to cooling before it enters the extrusion chamber so that the material therein is in a plastic state, and forcing the plastic material by the feeding impulses through the extrusion chamber and through a die mounted therein.

2. Extrusion apparatus comprising an extrusion chamber with a die through which material is forced out, means for producing impulses acting on molten material, a passage conducting the material from the impulse producing means into the said chamber, said passage being of much smaller cross-section than the extrusion chamber, and cooling means acting on the material in the said passage so that it enters the chamber in a plastic state.

3. Extrusion apparatus comprising an extrusion chamber, from which plastic material is forced through a die, means for feeding this chamber with plastic material at a number of points round its circumference, said means comprising impulse producing devices applying their impulses in succession to molten material, means for conducting the molten material from each of said devices to the feeding points of the said chamber, each of said conducting means comprising a passage of much smaller cross-section than the extrusion chamber, and a cooling device acting on each of said passages and serving to convert the material to the plastic state before it enters the extrusion chamber.

4. Extrusion apparatus comprising an extrusion chamber from which plastic material is forced out through a die, a pump, a heated pipe from the pump to the chamber and a cooling passage of much smaller cross-section than the extrusion chamber, said passage being attached to the pipe and connecting it with the chamber so that the molten material acted on by the pump is maintained molten while passing through the pipe and is then cooled to the plastic state before it enters the extrusion chamber.

In testimony whereof I affix my signature.

WILLIAM TRAVIS.